UNITED STATES PATENT OFFICE.

WILLIS A. GIBBONS, OF NEW YORK, N. Y., ASSIGNOR TO REVERE RUBBER COMPANY, A CORPORATION OF RHODE ISLAND.

METHOD OF COVERING TENNIS BALLS.

1,415,438. Specification of Letters Patent. Patented May 9, 1922.

No Drawing. Application filed August 24, 1921. Serial No. 494,946.

*To all whom it may concern:*

Be it known that I, WILLIS A. GIBBONS, a citizen of the United States, and a resident of New York, county of New York, and State of New York, have invented certain new and useful Improvements in Methods of Covering Tennis Balls, of which the following is a full, clear, and exact description.

This invention relates to tennis balls, and more particularly to an improved method of securing covers thereto.

Tennis balls, whose covers have been vulcanized to the rubber center without stitching their adjacent edges, in play on a hot day expand and not infrequently open up and part at the seams where the cover sections abut against one another. I have discovered that this objectionable opening or parting at the seams may be obviated by applying the cover to the center while the latter is abnormally expanded or distended, as by heating at a temperature approximating and preferably above that developed in use and then vulcanizing the cover in a mold of the usual size, the contraction of the center in cooling to room temperature causing the abutting edges of the cover sections to be compacted against one another and consequently permitting the inevitable expansion of the center in play without opening or parting of the seams.

The vulcanized rubber center may be made in any suitable manner, as by the "reinflation" or "trapped air" methods in common use or by the "created" pressure method disclosed in my contemporaneous application, Serial No. 494,868 filed of even date herewith. The more or less perfectly cured rubber center and the cover sections, which are of a slightly larger size than usual, are then prepared for union by suitably coating with a heat settable material, such as balata or with a vulcanizable cement with or without coats of pure gum in solution. Preferably the center and cover sections are gently dried in any convenient manner for facilitating handling them. But the manner of preparing the center and cover sections and the materials employed to permit their subsequent integral union specifically form no part of the present invention, any suitable materials and method of applying them being comprehended in this invention.

According to my invention the rubber center is to be distended or expanded to a size at least as great as that it assumes in play under the usual conditions on a court, where both vigorous stroking of the ball and heat of the sun cause the center to attain a temperature of from 90 to 100° F. Preferably I gently heat the rubber center to a temperature around 130° F. more or less as the character of the rubber composition and the extent of the cure of the center require. While thus increased in size, I assemble the prepared cover sections about the ball setting the edges thereof closely together in contact. Ordinarily this assemblage is accomplished by hand and the more carefuly done the better. Undue stretching of the felt or other material of which the cover sections may be composed is to be avoided. The tacky nature of the coating material, vulcanizable cement being preferred, permits the cover sections to be thus assembled and maintained in position.

The ball is then cooled down to the normal room temperature, either naturally or artificially. Then it is introduced into a mold of a size snugly fitting the roughly covered center at the ordinary room temperature and pressure. If difficulty is encountered in closing the mold upon the roughly covered center, the ball may, of course, be cooled down below normal temperature to facilitate its mounting in the mold. But such abnormal cooling is not necessary.

The ball thus covered and positioned in the mold is then subjected to a suitable heat, a temperature of 225° F. for twenty minutes being suitable for the ordinary quick vulcanizing cement.

The expansion of the rubber center before assemblage on the cover sections thereof may be accomplished by an extra inflation of the center instead of by heating. This may be done by inserting a hypodermic needle through a green rubber plug previously incorporated on the interior of the center in a manner well known, the extent of inflation being gauged by a ring of suitable size. This alternative procedure, however, increases the danger of leakage and is not as desirable as the heating method.

The method of the present invention results in integrally or vulcanizingly uniting the cover to the tennis ball. Objectionable seam opening or gapping that has heretofore been encountered with the stitchless covered ball is obviated owing to the fact that the cover has been assembled with tight fitting seams when the center is of a size larger than that to which it becomes expanded in play on a court on a hot day.

From the foregoing description of the method of the present invention, it will be clear that it is not limited to the use of any particular materials for uniting the cover sections to the center, or to any particular manner of abnormally distending the center preliminary to the mounting of the cover sections thereon. It might be employed with advantage in stitched-on covers, taking the strain off the threads. For an understanding of the scope of the invention reference should therefore be made to the accompanying claims.

Having thus described my invention, what I claim and desire to protect by Letters Patent is:

1. The method of covering tennis balls which consists in coating either or both a vulcanized and inflated center and cover sections with a heat settable plastic, expanding the center from its normal size to a size at least as great as that it assumes on heating in play, assembling the cover sections on the center with their edges in abutting relation while the center is expanded, reducing the thus covered center to normal size, and finally permanently adhering the cover sections to the center in a mold by heating.

2. The method of covering tennis balls which consists in coating either or both a vulcanized and inflated center and cover sections with a vulcanizable material, expanding the center from its normal size to a size at least as great as that it assumes on heating in play, assembling the cover sections on the center with their edges in abutting relation while the center is expanded, reducing the thus covered center to normal size, and finally vulcanizing.

3. The method of covering tennis balls which consists in coating either or both a vulcanized and inflated center and cover sections with vulcanizable material, heating the center and thus expanding it to a size at least as great as that it assumes on heating in play, assembling the cover sections on the center with their edges in abutting relation while the center is expanded, cooling the thus covered center and thus reducing it to normal size, and finally vulcanizing the cover sections to the center in a mold.

4. The method of covering tennis balls which consists in coating either or both a vulcanized and inflated center and cover sections with vulcanizable material, heating the center to a temperature at or above 100° F., assembling the cover sections on the center while the center is expanded at the elevated temperature and with their edges in abutting relation, cooling the thus covered center to normal room temperature, and finally vulcanizing the cover sections to the center in a mold.

Signed at New York, New York, this 15 day of August, 1921.

WILLIS A. GIBBONS.